(12) United States Patent
Pierce

(10) Patent No.: US 11,904,244 B1
(45) Date of Patent: Feb. 20, 2024

(54) MULTIDIMENSIONAL SPORTS SYSTEM

(71) Applicant: Carrick J. Pierce, New York, NY (US)

(72) Inventor: Carrick J. Pierce, New York, NY (US)

(*) Notice: Subject to any disclaimer, the term of this patent is extended or adjusted under 35 U.S.C. 154(b) by 435 days.

(21) Appl. No.: 17/176,567

(22) Filed: Feb. 16, 2021

(51) Int. Cl.
*A63F 13/816* (2014.01)
*A63F 13/65* (2014.01)
*A63F 13/5258* (2014.01)
*A63F 13/27* (2014.01)

(52) U.S. Cl.
CPC .............. *A63F 13/65* (2014.09); *A63F 13/27* (2014.09); *A63F 13/5258* (2014.09); *A63F 13/816* (2014.09); *A63F 2300/8005* (2013.01); *A63F 2300/8023* (2013.01); *A63F 2300/8082* (2013.01)

(58) Field of Classification Search
CPC ........ A63F 13/27; A63F 13/65; A63F 13/816; A63F 13/5258; A63F 2300/8005; A63F 2300/8023; A63F 2300/8082
See application file for complete search history.

(56) References Cited

U.S. PATENT DOCUMENTS

| | | | | |
|---|---|---|---|---|
| 4,028,733 A * | 6/1977 | Ulicki | .................. | H04N 1/4413 386/230 |
| 4,592,546 A * | 6/1986 | Fascenda | ................ | A63F 13/30 463/40 |
| 4,662,635 A * | 5/1987 | Enokian | .................. | A63F 13/95 463/31 |
| 6,080,063 A | 6/2000 | Khosla | | |
| 6,726,567 B1 | 4/2004 | Khosla | | |
| 6,940,538 B2 * | 9/2005 | Rafey | .................... | H04N 5/272 348/E5.022 |
| 6,990,681 B2 * | 1/2006 | Wang | ............... | H04N 21/47205 348/E5.022 |
| 7,855,638 B2 | 12/2010 | Huston | | |
| 8,083,589 B1 * | 12/2011 | Kavars | .................. | A63F 13/428 73/489 |

(Continued)

FOREIGN PATENT DOCUMENTS

| | | | | |
|---|---|---|---|---|
| EP | 2025369 A2 * | 2/2009 | ........... | A43B 3/0005 |
| WO | WO-2009073610 A2 * | 6/2009 | ......... | A63B 24/0006 |
| WO | WO-2013027064 A2 * | 2/2013 | ......... | A63B 24/0021 |

*Primary Examiner* — Steven J Hylinski
(74) *Attorney, Agent, or Firm* — Goldstein Law Offices, P.C.

(57) ABSTRACT

A multidimensional sports system for playing a multidimensional sports game having a physical component played by physical players manipulating a movable game object within a physical playing area, and a virtual component played by virtual game users within a virtual game space inside a virtual competitive game. The multidimensional sports system comprises an interactive game portal with a physical portal boundary and a sensor, a game host device for implementing the virtual competitive game, and a game object projector. A physical to virtual game transition occurs upon the sensor detecting the movable game object crossing the physical portal boundary, suspending the physical component and initiating the virtual component. The virtual component is played until a virtual game object crosses a virtual portal boundary, causing a virtual to physical transition suspending the virtual component and causing the game object projector to launch the movable game object onto the physical playing area.

11 Claims, 12 Drawing Sheets

(56) References Cited

U.S. PATENT DOCUMENTS

| | | | |
|---|---|---|---|
| 8,128,469 B2* | 3/2012 | Hormigo Cebolla | A63F 13/352 235/382 |
| 8,303,387 B2 | 11/2012 | Spivack | |
| 8,634,943 B2 | 1/2014 | Root | |
| 8,932,136 B2* | 1/2015 | Lemmons | A63F 13/35 463/40 |
| 8,968,099 B1 | 3/2015 | Hanke et al. | |
| 9,033,781 B2 | 5/2015 | Steir et al. | |
| 9,055,271 B2 | 6/2015 | Verna et al. | |
| 9,089,775 B1* | 7/2015 | Daniel | A63F 13/65 |
| 9,573,064 B2 | 2/2017 | Kinnebrew et al. | |
| 10,532,283 B2 | 1/2020 | Parker et al. | |
| 10,786,742 B1* | 9/2020 | Mullikin | H04N 21/42224 |
| 10,898,789 B2* | 1/2021 | Dayal | A63F 7/307 |
| 2001/0003715 A1* | 6/2001 | Jutzi | A63F 13/65 463/40 |
| 2005/0049022 A1 | 3/2005 | Mullen | |
| 2005/0127601 A1* | 6/2005 | Giegerich | A63F 7/06 273/108.1 |
| 2005/0130725 A1 | 6/2005 | Creamer et al. | |
| 2009/0029754 A1* | 1/2009 | Slocum | A63B 24/0087 463/32 |
| 2009/0111582 A1* | 4/2009 | Schuler | A63F 13/216 473/415 |
| 2010/0279774 A1 | 11/2010 | Braig et al. | |
| 2011/0319148 A1* | 12/2011 | Kinnebrew | G06V 20/42 463/43 |
| 2012/0202594 A1* | 8/2012 | Bistis | G06T 19/006 463/31 |
| 2012/0269494 A1 | 10/2012 | Satyanarayana et al. | |
| 2015/0057775 A1* | 2/2015 | Dong | A63B 69/0071 700/91 |
| 2016/0023118 A1 | 1/2016 | Mindes | |
| 2017/0095716 A1* | 4/2017 | Lewis | A63B 69/40 |
| 2017/0161561 A1* | 6/2017 | Marty | H04N 23/90 |
| 2021/0146220 A1* | 5/2021 | Hall | A63B 63/004 |

* cited by examiner

MULTIDIMENSIONAL SPORTS SYSTEM

TECHNICAL FIELD

The present disclosure relates generally to a system for playing a multidimensional sports game. More particularly, the present disclosure relates to a multidimensional sports game which transitions between a physical sports activity and a virtual competitive game.

BACKGROUND

Traditional spectator sports, such as soccer, football, baseball, and other sports games continue to be popular amongst sports fans in spite of the growing appeal of competitive video gaming. However, competitive video games hold some key evolutionary advantages over conventional sports, as new video games offering continual technical improvements and novel gameplay elements are constantly entering the market. In contrast, evolutionary change in conventional sports seldom occurs, thus creating a risk of conventional sports becoming stale in the face of competition from competitive video gaming.

Many examples of video games which mix virtual and real-world elements may be found within the prior art. One example within the prior art creates an electronic simulation which mirrors a live sport being played concurrently, allowing players to compete against other players, or the simulated representations of the real-life athletes participating in the live sport. However, the simulated features of the exemplary art do not directly affect the live sport. Instead, the simulated features occur in parallel with the live sport, and are provided solely for the amusement of the players and spectators.

Therefore, a need exists for a system which allows a hybridized game to be played which involves direct interactions between a physical sport and a virtual game, facilitated by a physical apparatus which allows the physical sport and the virtual game to directly affect each other in a series of transitions between the physical and virtual elements of the hybridized game. This further allows the physical sport to retain its essential character, while being enhanced by the virtual game.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions, or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system which allows a sports game to be played in a physical dimension as well as a virtual dimension while facilitating transitions therebetween. Accordingly, the present disclosure provides a multidimensional sports system for playing a multidimensional sports game with a physical component played as a physical sports activity within a physical playing area, and a virtual component played within a virtual competitive game. The physical sports activity is played by physical players interacting with a movable game object, and the virtual competitive game is played by virtual game users controlling virtual players. The multidimensional sports system comprises an interactive game portal with a physical portal boundary and a portal boundary sensor, the portal boundary is adapted to detect a physical interaction between a movable game object and the physical portal boundary. The multidimensional sports system further comprises a game host device adapted to implement the virtual competitive game played within a virtual game space. The game host device initiates a physical to virtual game transaction upon the portal boundary sensor detecting the physical interaction, causing the multidimensional sports game to shift to the virtual competitive game and suspending the physical sports activity. The virtual game users then compete within the virtual game space to achieve a virtual game objective.

It is another aspect of an example embodiment in the present disclosure to provide a multidimensional sports system which allows the physical sports activity to affect the virtual competitive game upon the occurrence of the physical to virtual game transition. Accordingly, the multidimensional sports system further comprises a game object tracker which is adapted to track the movable game object as it travels along an inbound path and crosses the physical portal boundary to trigger the physical to virtual transition. The game host device is adapted to create a virtual game object which enters the virtual competitive through a virtual portal boundary and then travels along an inbound virtual path which approximates the inbound path of the movable game object in relation to the physical portal boundary. The virtual competitive game is then played by the virtual players competing to manipulate the virtual game object in order to achieve the virtual game objective.

It is yet another aspect of an example embodiment in the present disclosure to provide a multidimensional sports system which allows the virtual competitive game to affect the physical sports activity upon occurrence of a virtual to physical game transition. Accordingly, the game host device is adapted to initiate the virtual to physical game transition upon the virtual game object traveling along an outbound virtual path and crossing the virtual portal boundary. The multidimensional sports system further comprises a game object projector positioned within the physical playing area, the game object projector is adapted to project the movable game object along an outbound physical path within the physical playing area, thus suspending the virtual competitive game and causing the physical sports activity to resume.

It is a further aspect of an example embodiment in the present disclosure to provide a multidimensional sports system which allows the outbound motion of the virtual game object to be translated to the physical playing area. Accordingly, the game object launcher is adapted to rotate and elevate to adjust the trajectory of the outbound physical path in relation to the physical portal boundary, thus allowing the movement of the movable game object along the outbound physical path to approximate the movement of the virtual game object crossing the virtual portal boundary while traveling along the outbound virtual path.

It is still a further aspect of an example embodiment in the present disclosure to provide a multidimensional sports system which allows both the physical sports activity and the virtual competitive game to be viewed by spectators within a sports venue within which the physical playing area is contained. Accordingly, the multidimensional sports system further comprises a spectator screen positioned within the sports venue, the spectator screen is adapted to display game video depicting the virtual competitive game in progress. The multidimensional sports system further comprises a game transition alert device which is positioned within the physical playing area and emits a transition alert sound upon the occurrence of a physical to virtual game transition or a virtual to physical game transition.

It is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
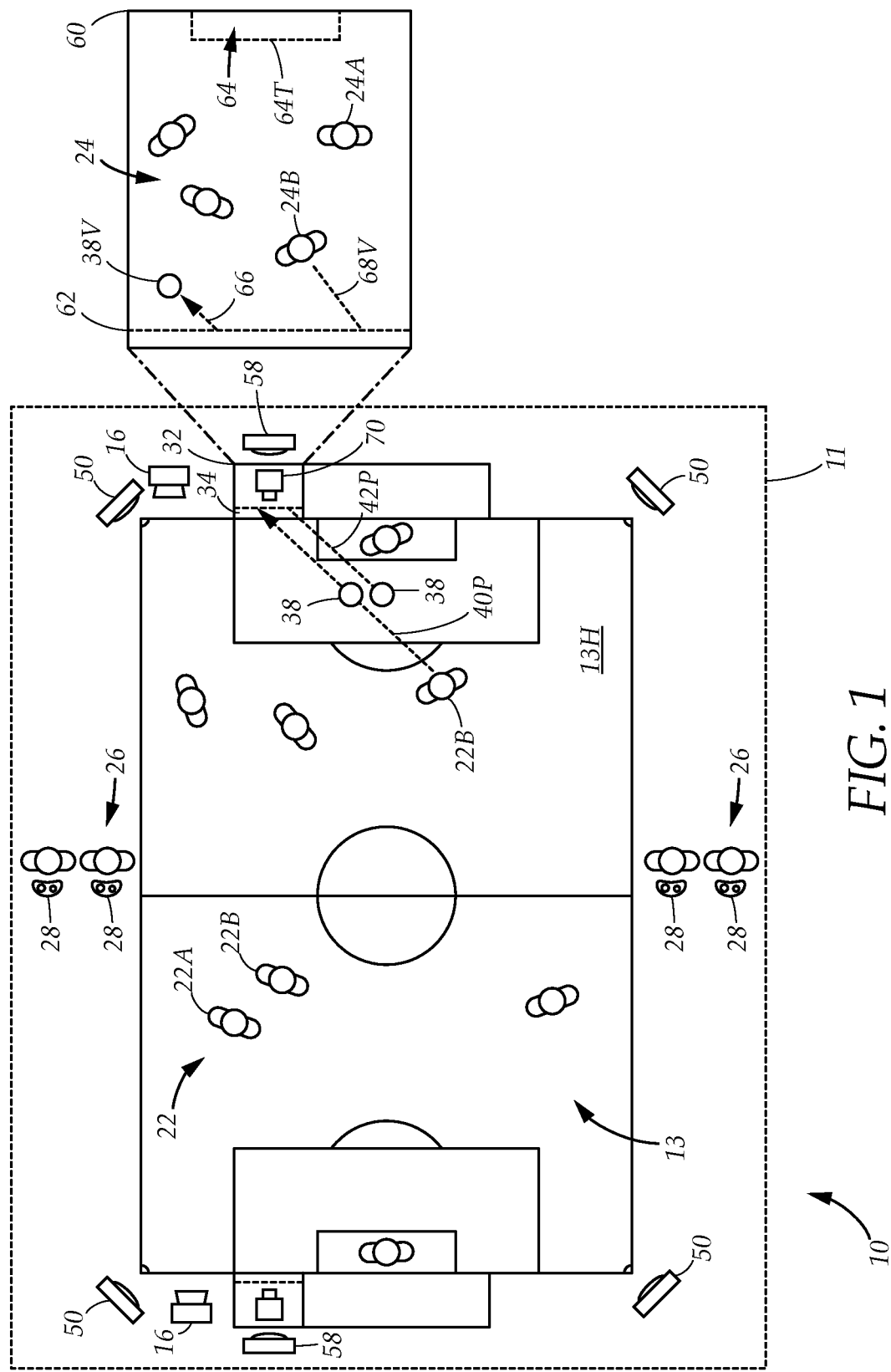
FIG. 1 is a diagrammatical plan view showing a multidimensional sports game being played within a physical playing area as well as a virtual game using a multidimensional sports system, in accordance with an embodiment in the present disclosure.
Figure 2A:
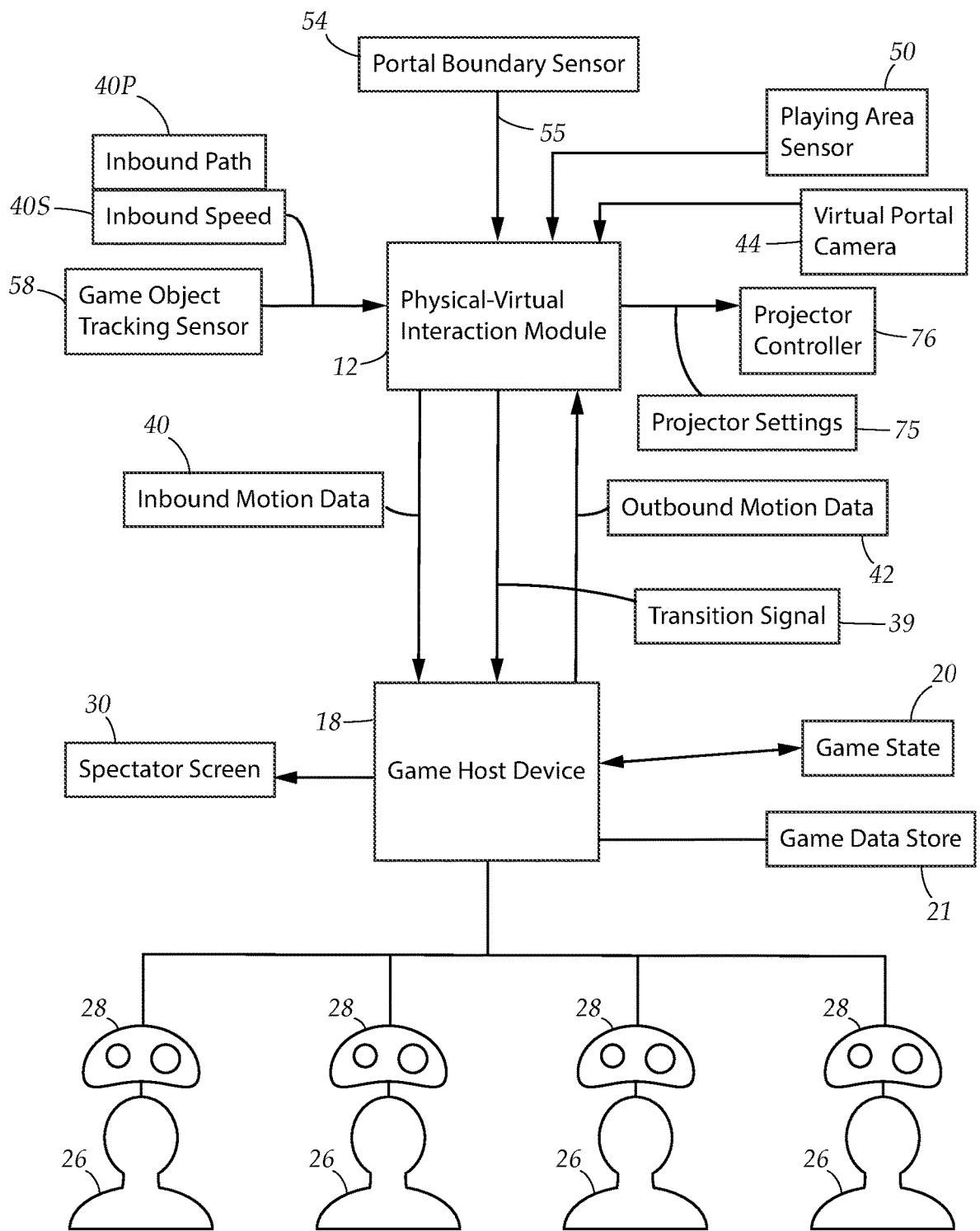
FIG. 2A is a block diagram depicting the operation of the multidimensional sports system, in accordance with an embodiment in the present disclosure.

FIGS. 1 and 2A illustrate a multidimensional sports system 10 for playing a multidimensional sports game, featuring interaction between a physical sports activity conducted within a physical playing area 13 and a virtual competitive game conducted within a virtual game space 60. The multidimensional sports system 10 comprises an interactive game portal 32 located within the physical playing area 13, a portal boundary sensor 54, a physical-virtual interaction module 12, and a game host device 18. The physical sports activity employs a movable game object 38 such as a ball which is thrown, kicked, struck, or manipulated within the physical playing area 13 by one or more physical players 22. The movable game object 38 may also correspond to a puck, discus, or any other equivalent piece of sports equipment. The virtual competitive game is a video game or entertainment computer program executed using the game host device 18, and is played by one or more virtual game users 26. Each of the virtual game users 26 may control one or more virtual players 24 within the virtual game space 60.

The multidimensional sports system 10 further comprises one or more player devices 28 operably connected to the game host device 18, which allow the virtual game users 26 to play the game by inputting user commands which control the virtual players 24 within the virtual game space 60. In a preferred embodiment, the multidimensional sports game is played by two opposing teams, with each team including both physical players 22 and virtual game users 26, who represent their teams in the physical sports activity and in the virtual competitive game portions of the multidimensional sports game respectively. For example, the multidimensional sports game may be played by a first team and a second team.

The physical playing area 13 represents a field, court, or other space within which sports activities are conducted. The physical playing area 13 may also have a physical playing area surface 13H, representing a horizontal planar surface upon which the physical players 22 and the movable game object 38 can move and interact. The physical playing area 13 may also be located within a sports venue 11, such as a stadium, arena, or other facility which allows an audience to view the physical playing area 13 and the physical sports activity. In one embodiment, the physical sport activity is a spectator sport such as baseball, soccer, football, basketball, or other sports activity. The multidimensional sports system 10 may further comprise one or more spectator screens 30 adapted to display the virtual competitive game to spectators positioned within the sports venue 11.

In a preferred embodiment, the multidimensional sports game is a competition between the two opposing teams. Therefore, various scoring mechanisms may be used to track progress in the competition and ultimately determine which team wins the multidimensional sports game. For example, a multidimensional game score may be used to determine which team wins the multidimensional sports game. In certain embodiments, the virtual competitive game may have a separate virtual game score, while the physical sports activity may have a physical game score. The virtual and physical game scores can be combined to affect the multidimensional game score.

Figure 2B:
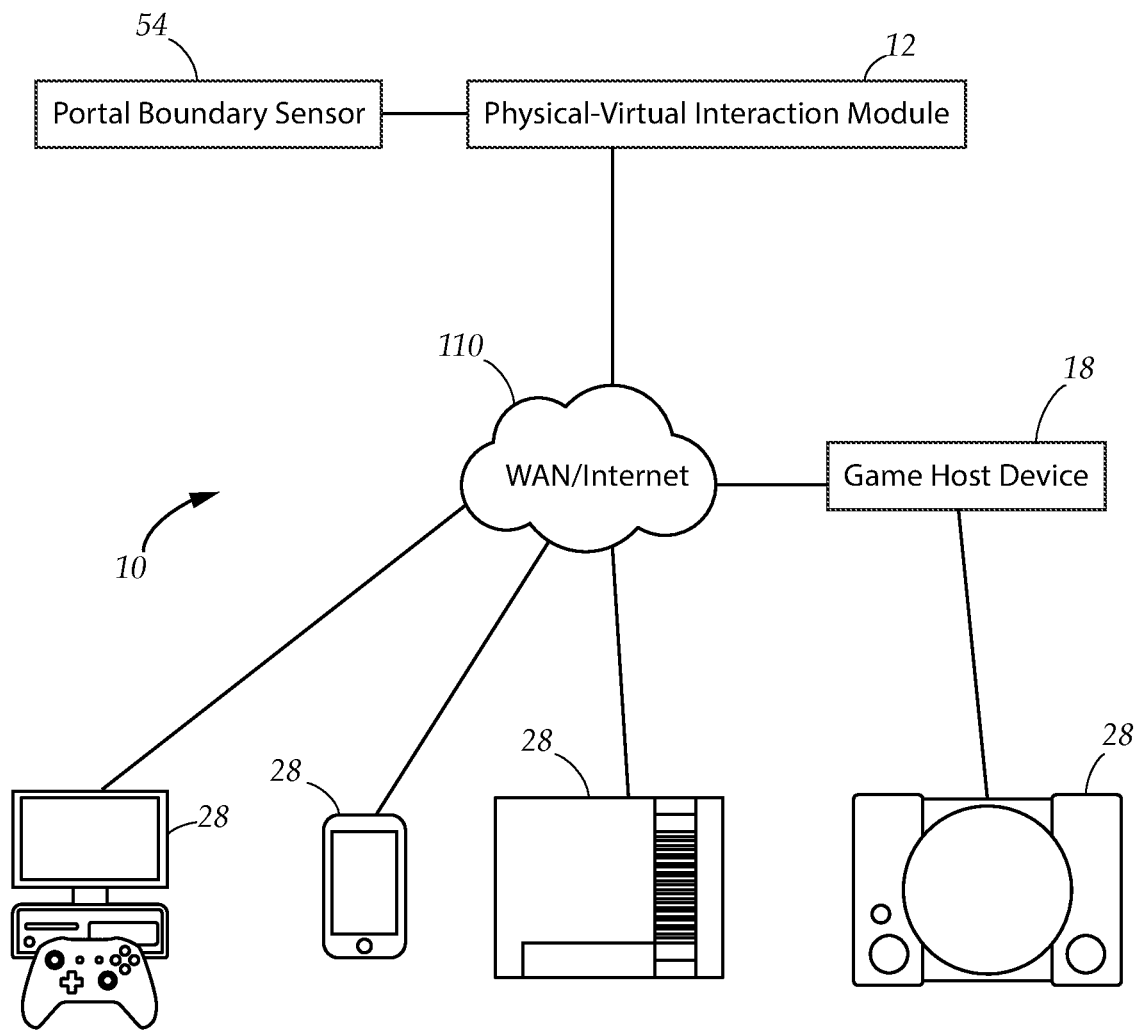
FIG. 2B is a block diagram depicting an example network architecture of the multidimensional sports system, in accordance with an embodiment in the present disclosure.
Figure 2C:
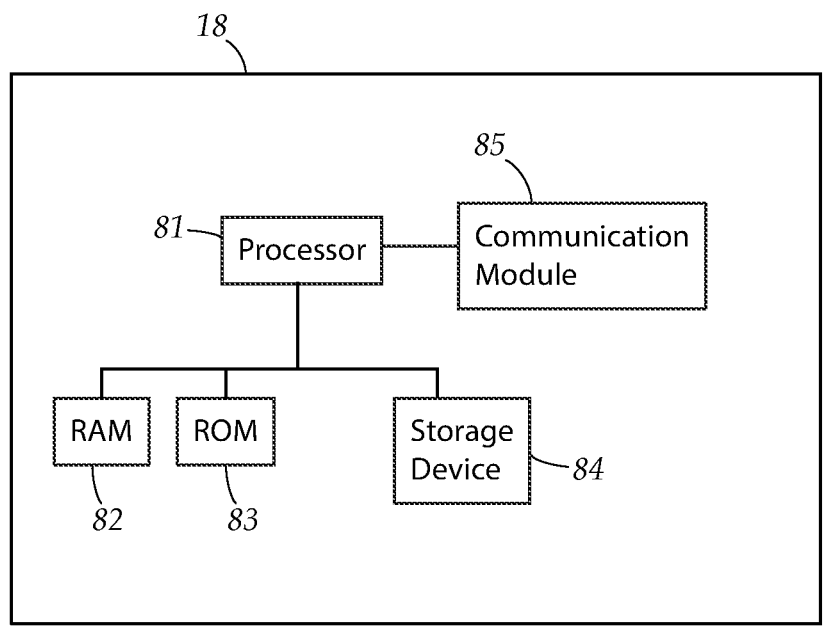
FIG. 2C is a block diagram depicting an example architecture of the game host device, in accordance with an embodiment in the present disclosure.

Referring to FIG. 1 along with FIGS. 2A-C, the game host device 18 is a computing device which is capable of executing the virtual competitive game. In one embodiment, the game host device 18 corresponds to a game server, computer, or game console, having a processor 81, a RAM 82, a ROM 83, a computer storage device 84 and a communication module 85. The computer storage device 84 may be used to store computer code and game data necessary for implementing the virtual competitive game, such as within a game data store 21. The game host device 18 can be positioned on-site at the sports venue 11, or can be implemented as a remote server which is accessible via a data communication network 110 such as the internet. In order to allow virtual competitive game users 26 to participate in the virtual competitive game from within the sports venue 11 or from a remote location, the player devices 28 may be located off-site or on-site at the sports venue 11. In embodiments where both the game host device 18 and the player devices 28 are located on-site within the sports venue 11, the player devices 28 may be connected to the game host device 18 via a local area network, short ranged wireless network, or other suitable communication means. The player devices 28 can be implemented using personal computers, game consoles, handheld game devices, smartphones, tablets, or any other suitable computing device for playing video games which is known to a person of ordinary skill in the art in the field of the invention. For example, the player device 28 may have a screen for displaying the virtual game space 60, an input device for receiving player commands, and a network communication device which allows the player device 28 to communicate with the game host device 18 via the data communication network 110. In certain embodiments, the player device 28 may be a game controller or other input device which is directly connected to the game host device 18 via a wired or wireless connection.

Figure 3A:
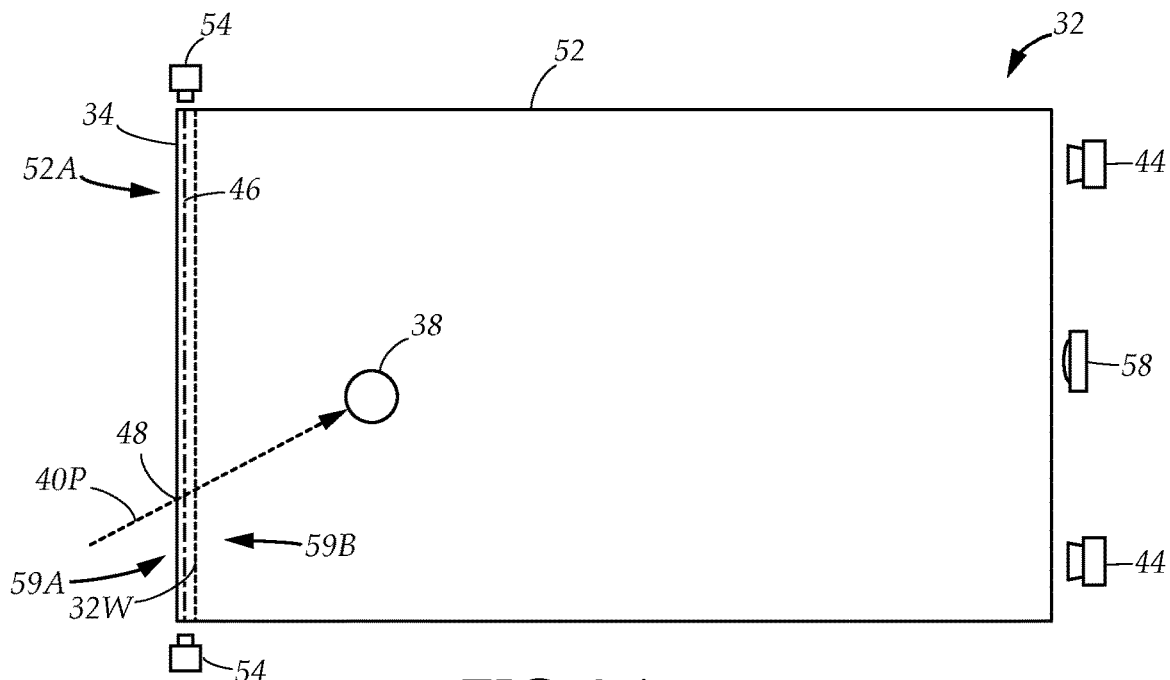
FIG. 3A is a diagrammatical top view of an example interactive game portal, depicting the movable game object crossing a physical portal boundary from a first side, in accordance with an embodiment in the present disclosure.
Figure 4A:
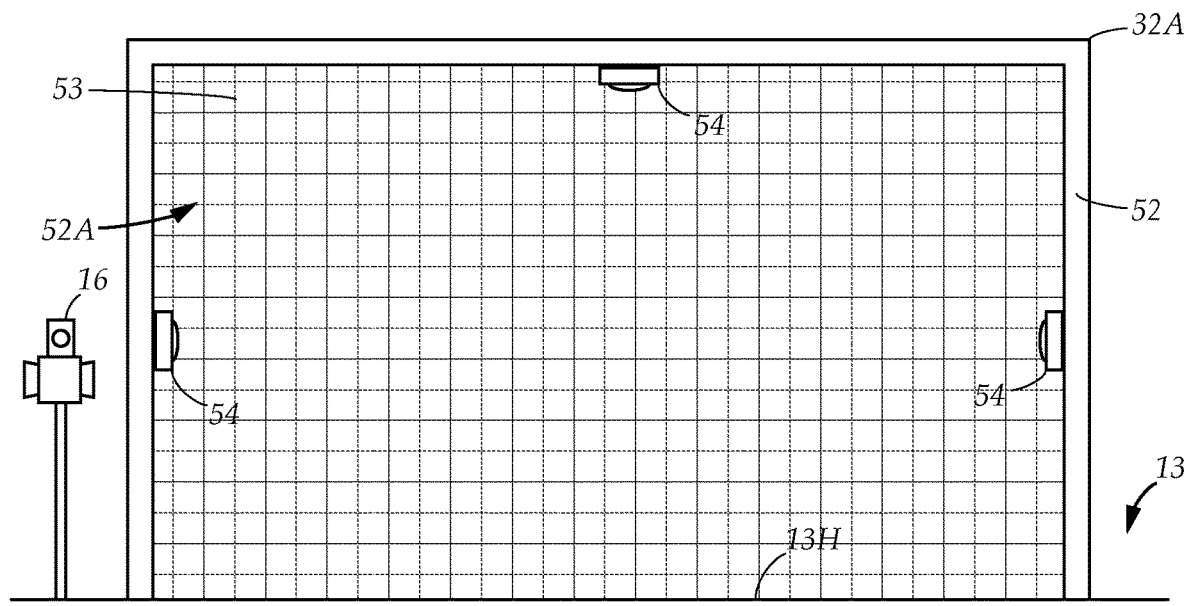
FIG. 4A is a diagrammatical front view of an example interactive game portal configured as a goal, in accordance with an embodiment in the present disclosure.

Returning to FIG. 1 while also referring to FIG. 2A, FIG. 3A, and FIG. 4A, the interactive game portal 32 is positioned within the physical playing area 13, and defines a physical portal boundary 34 which serves as a point of physical interaction between the physical sports activity and the virtual competitive game, and a portal boundary sensor 54 which is adapted to detect the physical interaction. The movable game object 38 may contact or pass through the physical portal boundary 34, thus triggering a physical interaction between the movable game object 38 and the interactive game portal 32, such as by the movable game object 38 passing through the physical portal boundary 34. The portal boundary sensor 54 is adapted to detect the passage of the movable game object 38 through the physical portal boundary 34, or other physical interaction as appropriate. Each portal boundary sensor may have a detection zone which has a range and/or area which varies depending on the sensor technology utilized. Each portal boundary sensor may be positioned such that the detection zone effectively covers the physical portal boundary 34. The physical portal boundary 34 may have a first side 59A through which the movable game object 38 passes through or approaches as it travels along an inbound path 40P, and a second side 59B positioned opposite thereof, through which the movable game object 38 subsequently exits.

Figure 4B:
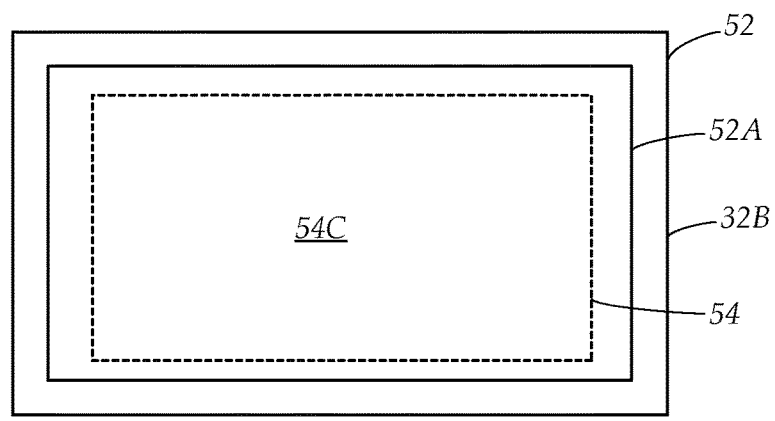
FIG. 4B is a diagrammatical front view of an example interactive game portal configured with a portal boundary contact surface, in accordance with an embodiment in the present disclosure.
Figure 4C:
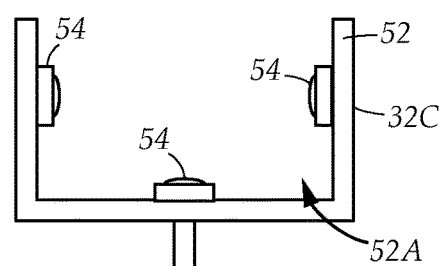
FIG. 4C is a diagrammatical front view of an example interactive game portal configured as field goal posts, in accordance with an embodiment in the present disclosure.

Referring to FIGS. 4A-C while also referring to FIG. 3A, the interactive game portal 32 can be configured in various shapes and sizes to suit different types of physical sports activities. In a preferred embodiment, the interactive game portal 32 is a physical apparatus positioned within the physical playing area 13, and has a frame 52 which defines the physical portal boundary 34. The frame 52 may be configured in a variety of shapes, and may have a frame opening 52A which allows the movable game object 38 to pass therethrough. The frame 52 may have a polygonal or circular shape, representing a net, goal, target, hoop, or other form of known sports apparatus which is adapted for interacting with a movable game object 38. Each portal boundary sensor 54 may be positioned around the frame 52 such that the detection zone is oriented inwardly towards the frame opening 52A. In some embodiments, the portal boundary sensor 54 may be integrated into existing sports equipment, such as soccer goals 32A or field goal posts 32C, thus allowing the existing sports equipment to function as an interactive game portal 32.

In one example, the frame 52 is shaped similarly to a rectangular goal 32A which projects vertically from the physical playing area 13 surface. The frame 52 of the rectangular goal 32A is similar to the horizontal crossbar and vertical goal posts of a conventional soccer goal. In the present example, the frame opening 52A is rectangular and has four sides, with the frame 52 defining three of the sides while the physical playing area surface 13H defines the fourth side. The frame opening 52A defines the physical portal boundary 34, and the portal boundary sensor 54 is adapted to detect the physical game interaction between the movable game object 38 and the physical portal boundary 34. The portal boundary sensors 54 can be implemented using various forms of motion sensors, ball-tracking cameras, laser or infra-red based sensors, or any sensors used for goal-line technology which are commonly used in sports games or which are known to a person of ordinary skill in the art in the field of the invention. In other embodiments, the movable game object 38 may incorporate a passive or active RF transmitter, and the portal boundary sensor 54 can be adapted to detect RF signals transmitted by the movable game object 38 and determine when the movable game objects 38 passes through the frame opening 52A. In certain embodiments, the portal boundary sensor 54 may be a video camera which captures video of the movable game object 38, and image analysis technology may be used to analyze the video to detect the interaction between the movable game object 38 and the physical portal boundary 34. A person of ordinary skill in the art in the field of the invention will appreciate that video-based image analysis technology is commonly used in the field of sports to analyze player movements and track the motion of balls in relation to reference objects, such as goal posts.

In alternate embodiments, the interactive game portal 32 may have a portal boundary contact surface 54C having one or more portal boundary sensors 54 configured as contact sensors which registers a physical interaction by detecting the physical impact when the movable game object 38 contacts the portal boundary contact surface 54C. The portal boundary contact surface 54C may be positioned across the frame opening 52A. Referring to FIG. 4B while also referring to FIG. 1, FIG. 4B depicts a variant of the interactive game portal 32B which has a portal boundary contact surface 54C which stretches across the frame opening 52A and has an embedded portal boundary sensor 54 for detecting an impact resulting from the movable game object 38 contacting the portal boundary contact sensor 54C. The contact sensors can be implemented using a variety of technologies which will be apparent to a person of ordinary skill in the art in the field of the invention. For example, the contact sensors may be implemented using pressure activated switches, thin film pressure sensors, or any other suitable technology. In certain embodiments, the interactive game portal 32 may lack a frame 52, with the physical portal boundary 54 being defined solely by the portal boundary contact surface 54C.

Figure 4D:
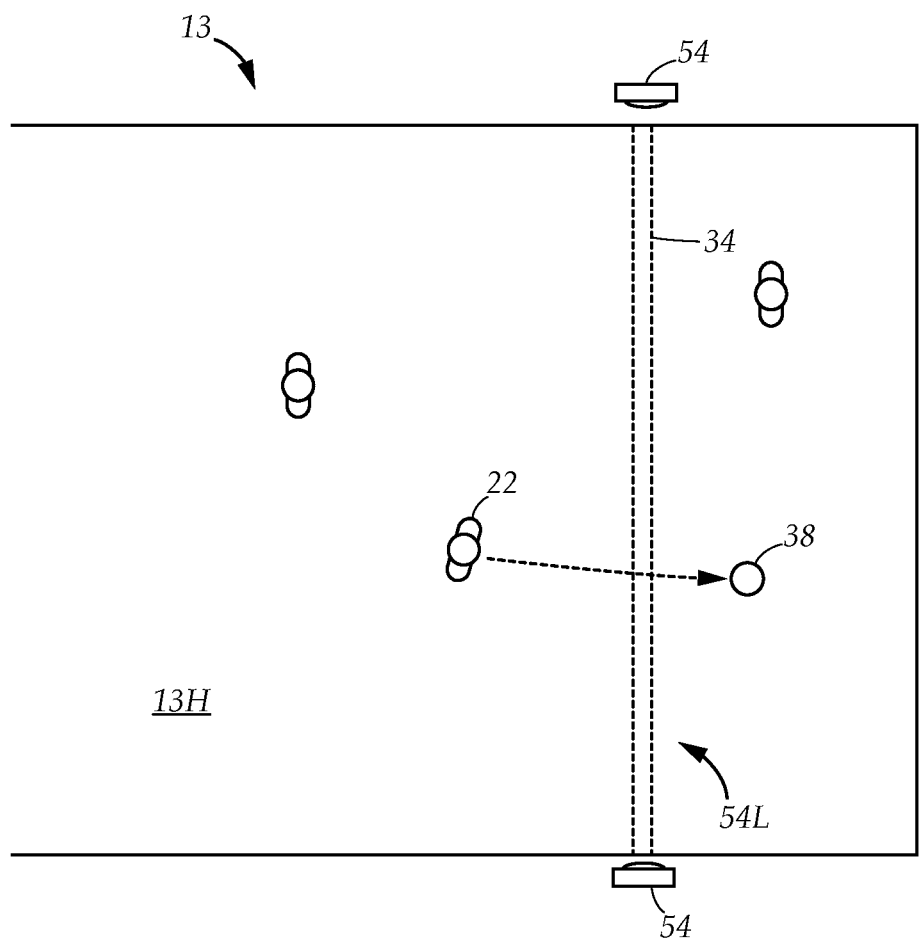
FIG. 4D is a diagrammatical top view of a physical playing area surface, depicting the physical portal boundary superimposed over a boundary line marked on the physical playing area surface, in accordance with an embodiment in the present disclosure.

Referring to FIG. 4D while also referring to FIG. 1 and FIG. 4A, in certain embodiments, the interactive game portal 32 may lack a physical frame 52. Instead, the physical portal boundary 34 may correspond to a portal boundary line 54L which is drawn on the physical playing area surface 13H. One or more portal boundary sensors 54 are positioned to observe the boundary line 54L and detect a physical interaction whereby the movable game object 38 crosses the boundary line 54L. In certain embodiments, the portal boundary line 54L may be superimposed upon an extant sideline, midfield line, goal line, or other established boundary or marker which has significance to the physical sports activity.

Referring to FIG. 2A while also referring to FIG. 1, the physical-virtual interaction module 12 serves as a link between the interactive game portal 32 and the game host device 18. The physical-virtual interaction module 12 is operably connected to the portal boundary sensor 54. In one embodiment, the portal boundary sensor 54 transmits sensor data 55 describing the physical interaction to the physical-virtual interaction module 12. The physical-virtual interaction module 12 then transmits a transition signal 39 to the game host device 18. Upon receiving the transition signal 39, the game host device 18 initiates gameplay of the virtual competitive game, thus causing a physical to virtual game transition to occur, whereby the gameplay of the multidimensional sports game shifts from the physical sports activity to the virtual competitive game. The gameplay of the multidimensional sports game may shift from the virtual competitive game back to the physical sports activity via a virtual to physical game transition.

Referring to FIG. 1, FIG. 2A, and FIG. 4A, in some embodiments, the multidimensional sports system 10 further comprises a game transition alert device 16 positioned within the physical playing area 13, the game transition signaling device 16 is adapted to produce a transition alert sound or visible alert signal upon the portal boundary sensor 54 detecting the physical interaction, or upon the occurrence of a physical to virtual game transition or a virtual to physical game transition.

Figure 2D:
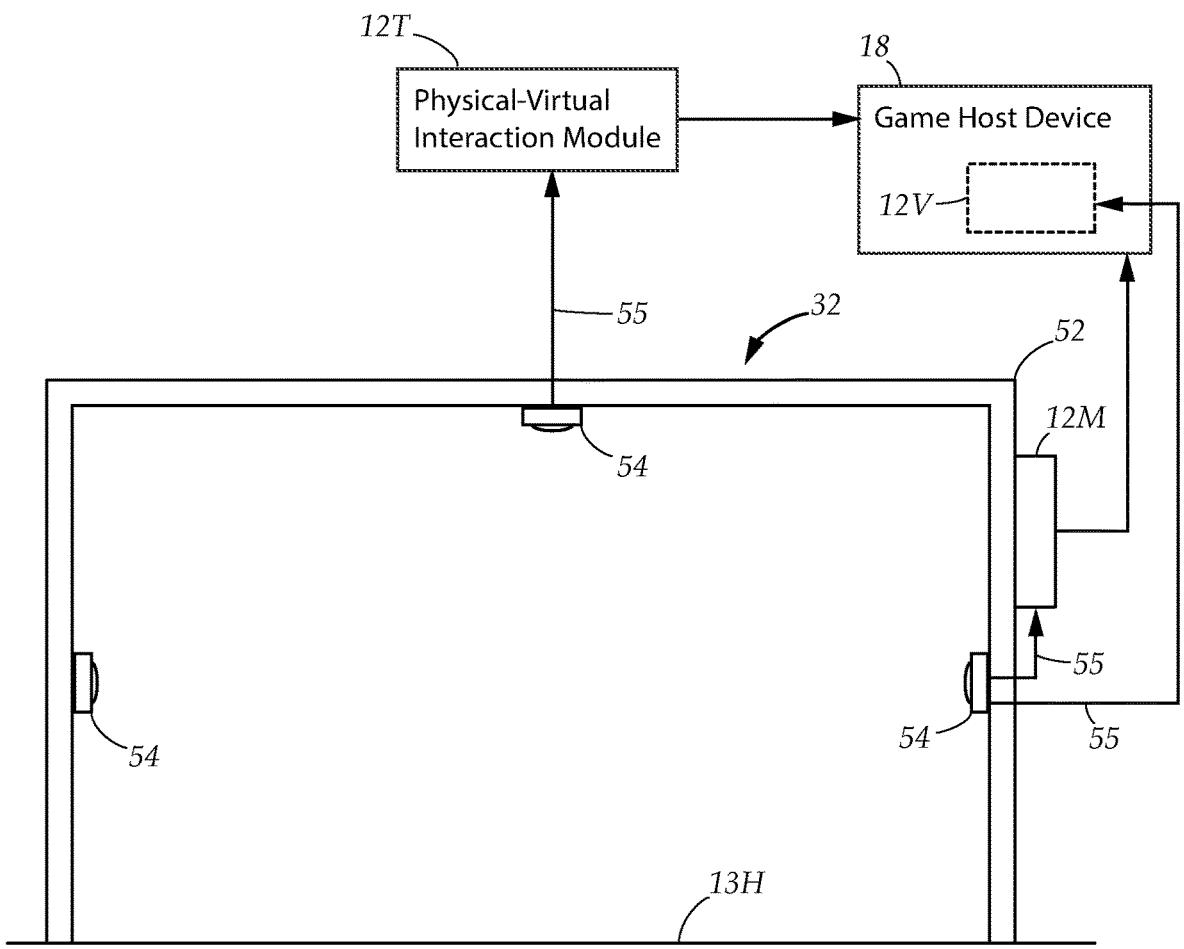
FIG. 2D is a diagrammatical front view depicting an example interactive game portal, in accordance with an embodiment in the present disclosure.

Referring to FIG. 2D while also referring to FIG. 2A-B, the physical-virtual interaction module 12 may be implemented in several variations depending on the capabilities of the particular embodiment. In one embodiment, the physical-virtual interaction module 12M may be physically attached to or integrated with the interactive game portal 32, where it receives sensor data 55 from the portal boundary sensors 54. In another embodiment, the physical-virtual interaction module 12T is implemented using a standalone hardware device which receives sensor data 55 from the portal boundary sensors 54 via a wired or wireless connection. In this standalone configuration, the physical-virtual interaction module 12T is configured to communicate with the game host device 18 and transmit the transition signal 39 via the data communication network 110. In certain embodiments, the physical-virtual interaction module 12V may be implemented as a software module which is executed by the game host device 18. In such an embodiment where the physical-virtual interaction module 12V is implemented on the game host device 18, the portal boundary sensor 54 is configured to communicate with the game host device 18 and transmit the sensor data 55 via the data communication network 110. The software-based physical-virtual interaction module 12V functions by converting the sensor data 55 into a format which is interoperable with the virtual competitive game. In certain embodiments, the physical-virtual interaction module 12V may be implemented as an API (Application Programming Interface) which facilitates interoperability between the portal boundary sensors 54, the game object projector 70, the game object tracker 58, and the virtual competitive game.

Figure 5A:
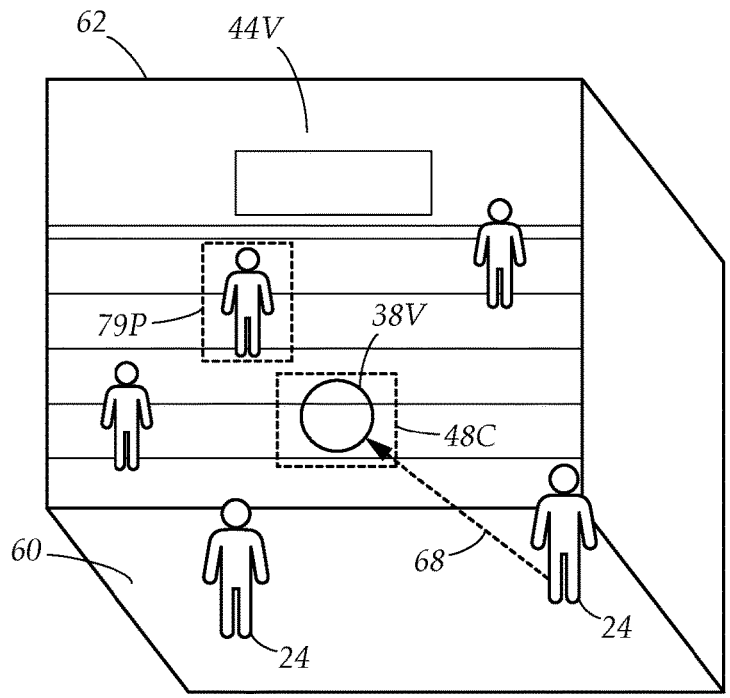
FIG. 5A is a diagrammatical perspective view of the interactive game space, depicting a virtual portal view superimposed over a virtual portal boundary, in accordance with an embodiment in the present disclosure.
Figure 5B:
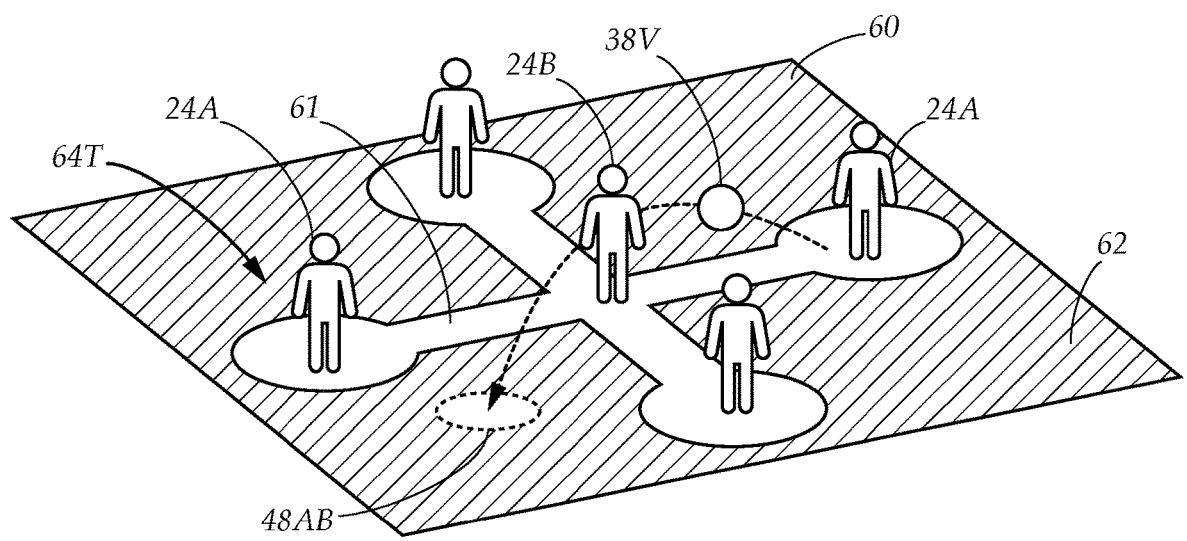
FIG. 5B is a diagrammatical perspective view of a virtual competitive game implemented as a discus throwing game, in accordance with an embodiment in the present disclosure.
Figure 6A:
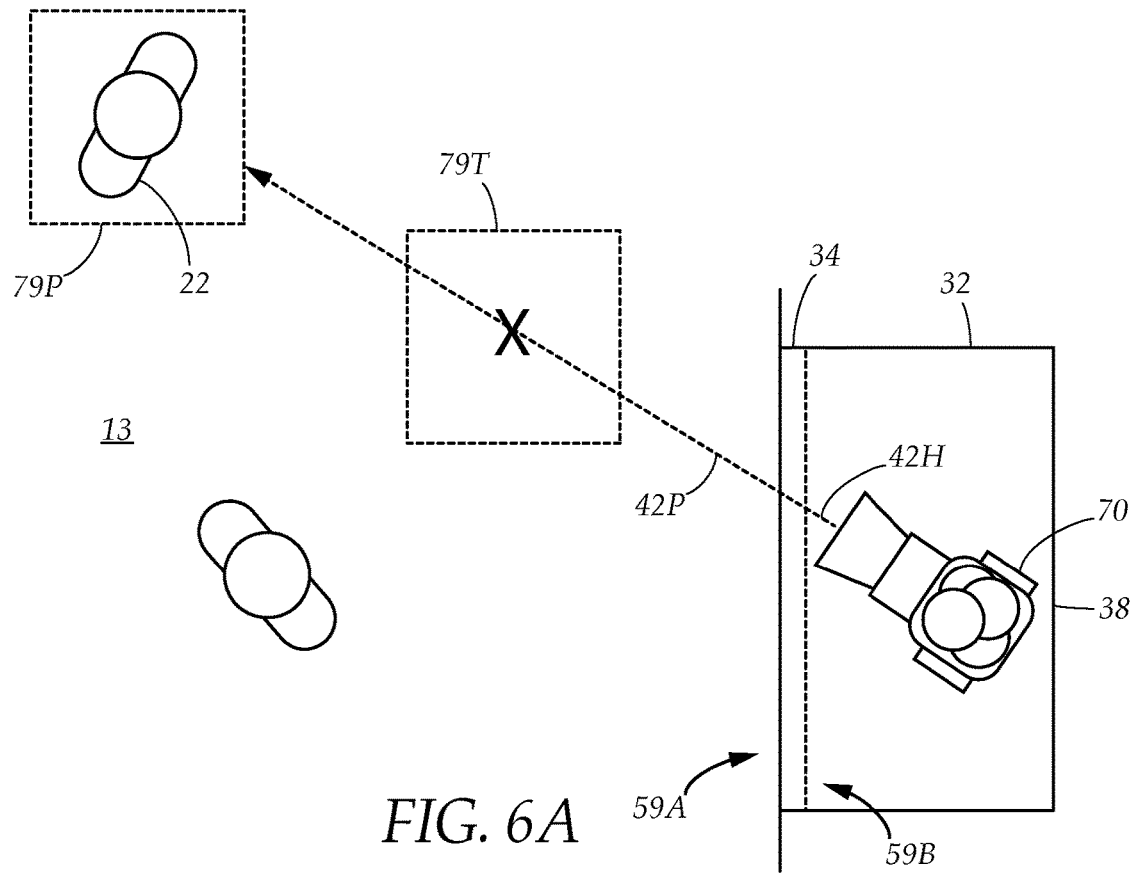
FIG. 6A is a diagrammatical top view of a game object projector positioned toward the second side of the physical portal boundary, further depicting the game object projector launching the movable game on an outbound physical path which passes through the second side of the physical portal boundary, in accordance with an embodiment in the present disclosure.
Figure 6B:
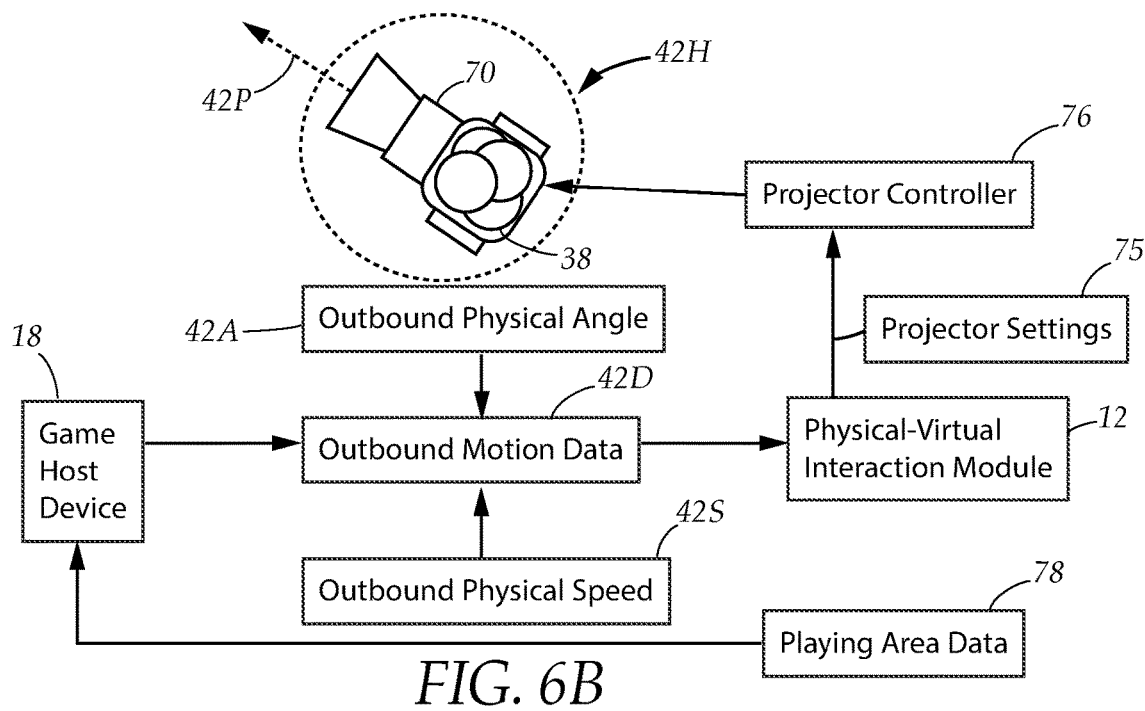
FIG. 6B is a diagrammatical top view of the game object projector, showing an exemplary process by which commands are transmitted from the game host device to the game object projector, in accordance with an embodiment in the present disclosure.
Figure 6C:
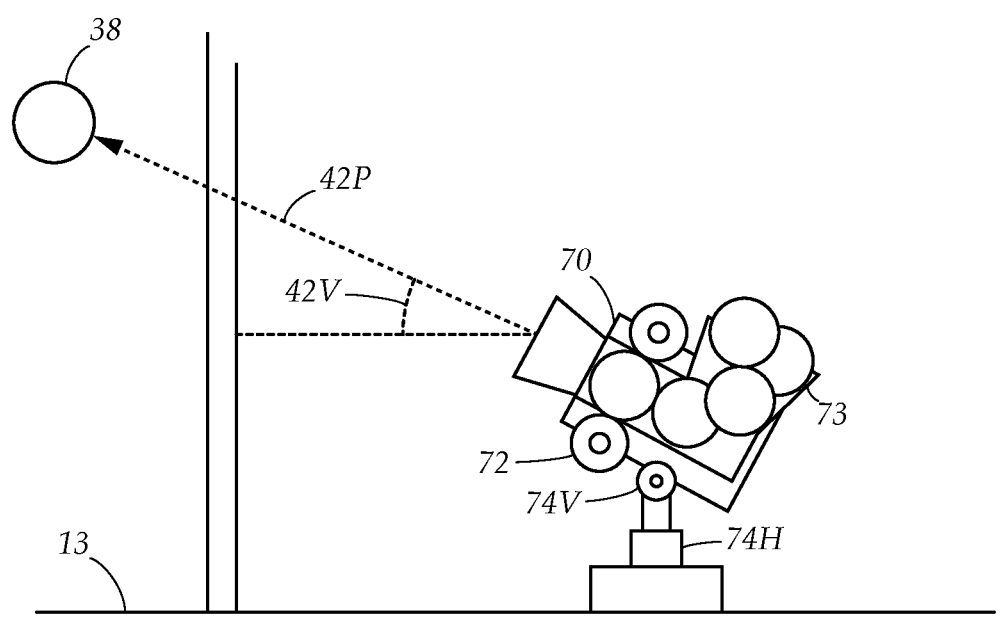
FIG. 6C is a diagrammatical side view of the game object projector showing a rotation mechanism and a vertical elevation mechanism for orienting the game object projector, and a launching mechanism for projecting the movable game object, in accordance with an embodiment in the present disclosure.

Referring to FIG. 1 while also referring to FIG. 2A and FIGS. 5A-B, the physical to virtual game transition causes a game effect to occur within the virtual competitive game, thus allowing the physical sports activity to directly affect the virtual competitive game. The virtual competitive game can be embodied via a game state 20. The game state 20 is maintained by the game host device 18, and represents the virtual game space 60, the position and/or status of the virtual players 24 along with any virtual game objects at a specific point in the execution of the virtual competitive game as well as the actions, options, or interactions which are available at that point. As the virtual competitive game progresses, the game host device 18 continually updates the game state 20. In one embodiment, the game host device 18 updates the game state 20 to reflect any game effects triggered by the physical to virtual game transition.

The virtual game space 60 is a virtual environment in which the virtual players 24 and virtual game objects can move or interact, and can be represented as a two-dimensional plane, a three dimensional space, or other environment found in video gaming. The virtual game space 60 may represent a simulated sports field, or may represent an environment which is unique to the virtual competitive game.

In certain embodiments, gameplay within the virtual competitive game begins when the physical to virtual game transition occurs. The virtual competitive game may be in a suspended or paused condition prior to the physical to virtual game transition, with the gameplay of the multidimensional sports game being carried out via the physical sports activity. In other embodiments, the virtual competitive game may be played concurrently with the physical sports activity prior to the physical to virtual game transition, such that when the physical to virtual game transition occurs, the resulting game effect is reflected in the game state 20.

Various game effects may be introduced to the virtual competitive game following the physical to virtual game transition in order to enhance the excitement of the multidimensional sports game. The gameplay of the virtual competitive game may complement the physical sports activity. In one embodiment, the virtual competitive game incorporates sports-themed competitive elements. The physical to virtual game transition causes a virtual game object 38V, such as a virtual ball, to be created within the virtual game space 60, which can then be manipulated by, or otherwise interact with, the virtual players 24. The virtual game object may bear the visual appearance of a real-world object such as a ball, discus, puck, or other piece of sports equipment, or may have the visual appearance of a fantastical object or item unique to the virtual competitive game.

The virtual competitive game is played by allowing the virtual game users 26 to control the virtual players 24 via user commands inputted via the player devices 28, causing the virtual players 24 to move and/or interact with the virtual game object 38V within the virtual game space 60 to achieve a virtual game objective 64. For example, the virtual game objective 64 may require the virtual players 24 deliver the virtual game object 38V to an objective target 64T. The objective target 64T may have the visual appearance of a goal, basket, net, finish line, or other suitable representation. The virtual players 24 may throw, kick, catch, hit, or carry the virtual game object 38V to the objective target 64T in order to achieve the virtual game objective 64. In certain embodiments, the objective target 64T may be another virtual player 24, thus allowing the virtual game objective 64 to be achieved by successfully passing the virtual game object 38V to said virtual player 24. For example, in one embodiment, the virtual competitive game may represent a discus-throwing game, with one of the virtual players 24A from the first team attempting to pass the virtual game object 38V to another virtual player 24A from the first team in order to achieve the virtual game objective 64. The virtual player 24B of the second team may attempt to interfere with the first team, such as by blocking the virtual game object 38V and/or deflecting the virtual game object 38V onto an outbound virtual path 68 towards the virtual portal boundary 62.

Note that in certain embodiments, the virtual competitive game may be played without a virtual game object 38V. The virtual game objective 64 may instead represent any competitive activity found in video games. For example, the virtual competitive game may be played as a racing game in which the virtual players 24 compete to reach the finish line or objective target 64T. In other embodiments, the virtual game objective 64 may also incorporate competitive video gameplay activities from a variety of video game genres which are unrelated to sports activities.

In addition to causing the creation of a virtual game object 38V such as a virtual ball, the physical to virtual game transition can trigger other game effects. The team responsible for triggering the physical to virtual game transition may be granted a game advantage in the virtual competitive game. For example, if a second team player 22B kicks the movable game object 38 across the physical portal boundary 34 to trigger the physical to virtual game transition, one of the second team virtual players 24B may be granted a game advantage in the virtual competitive game, as the second team is the triggering team. The game advantage may be any game effect or condition that grants one of the teams a competitive edge which makes it easier for the triggering team to achieve the virtual game objective 64. For example, the second team virtual player 24B may be granted initial possession or control over the virtual game object 38V, thus placing the first team on the defensive and giving the first team the opportunity to achieve the virtual game objective 64. Upon one of the teams achieving the virtual game objective 64, the team achieving the virtual game objective 64 is granted a virtual game bonus. The virtual game bonus can be an award of points towards the virtual game score or multidimensional game score, or other game effect which provides the team with an advantage.

Referring to FIG. 1, FIG. 2A, FIGS. 3A-B, and FIG. 5A, in certain embodiments, the virtual game space 60 contains a virtual portal boundary 62 which functions as a simulated window which virtually connects the virtual game space 60 to the physical play field. The virtual portal boundary 62 allows the movement of the movable game object 38 to be translated into the virtual game space 60. Once the movable game object 38 contacts or crosses the physical portal boundary 34, the game host device creates the virtual game object 38V which then enters the virtual game space 60 through the virtual portal boundary 62. For example, this game effect can simulate the movable game object 38 "reappearing" in the virtual game space 60 in virtual form after being kicked through the physical portal boundary 34 by a physical player 22. In a preferred embodiment, the physical to virtual game transition occurs in real-time, thus facilitating a near-instantaneous transition in the multidimensional sports game between the physical sports activity and the virtual competitive game.

Referring to FIG. 1, FIG. 2A, and FIGS. 4A-B, in certain embodiments, the multidimensional sports system 10 may further comprise a game object tracking sensor 58 adapted to track the motion of the ball or the movable game object 38 relative to the interactive game portal 32, allowing the relative motion of the movable game object 38 to be translated to the virtual game object 38V as it moves within the virtual game space 60. The motion of the movable game object 38 is measured by the game object tracking sensor 58 in the form of inbound motion data 40, which is collected as the movable game object 38 approaches the physical portal boundary 34 along an inbound path 40P and causes a physical interaction between the movable game object 38 and the physical portal boundary 34. In embodiments where the physical interaction corresponds to the movable game object 38 striking the portal boundary contact surface 54C, the inbound motion data 40 utilized with the virtual competitive game may be captured immediately prior to the physical interaction, prior to any sudden loss of speed resulting from the physical interaction.

Various technologies may be used to implement the game object tracking sensor 58. The inbound motion data 40 may be collected using radar based technology which directly measures the speed and path of the movable game object 38, computerized video analysis which extrapolates the speed and path based on video footage of the movable game object 38, as well as any technologies which are known to a person of ordinary skill in the art in the field of the invention. In one embodiment, the game object tracking sensor 58 may transmit inbound motion data 40 to the physical-virtual interface interaction module 12, whereby the physical-virtual interaction module 12 converts the inbound motion data 40 into a data format which is interoperable with the virtual competitive game. Note that in certain embodiments, the functions of the portal boundary sensor 54 and the game object tracking sensor 58 may be implemented using a single sensing device.

Figure 3B:
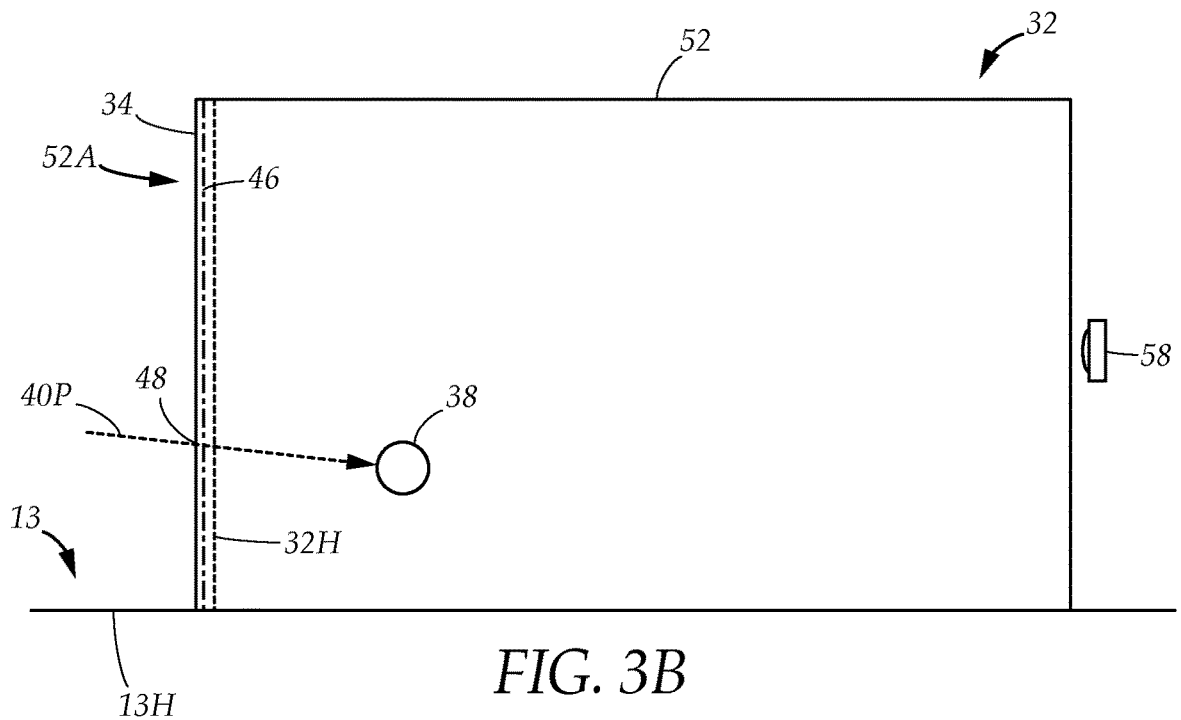
FIG. 3B is a diagrammatical side view of the example interactive game portal, in accordance with an embodiment in the present disclosure.
Figure 3C:
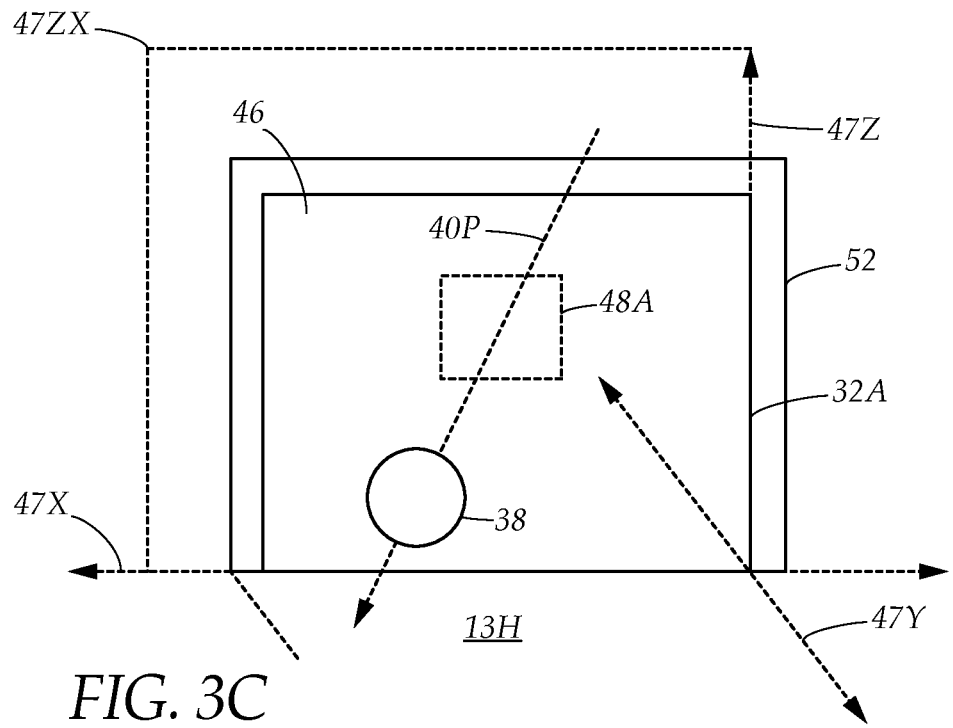
FIG. 3C is a diagrammatical perspective view of the movable game object traveling along an inbound path which crosses the physical portal boundary, in accordance with an embodiment in the present disclosure.
Figure 3D:
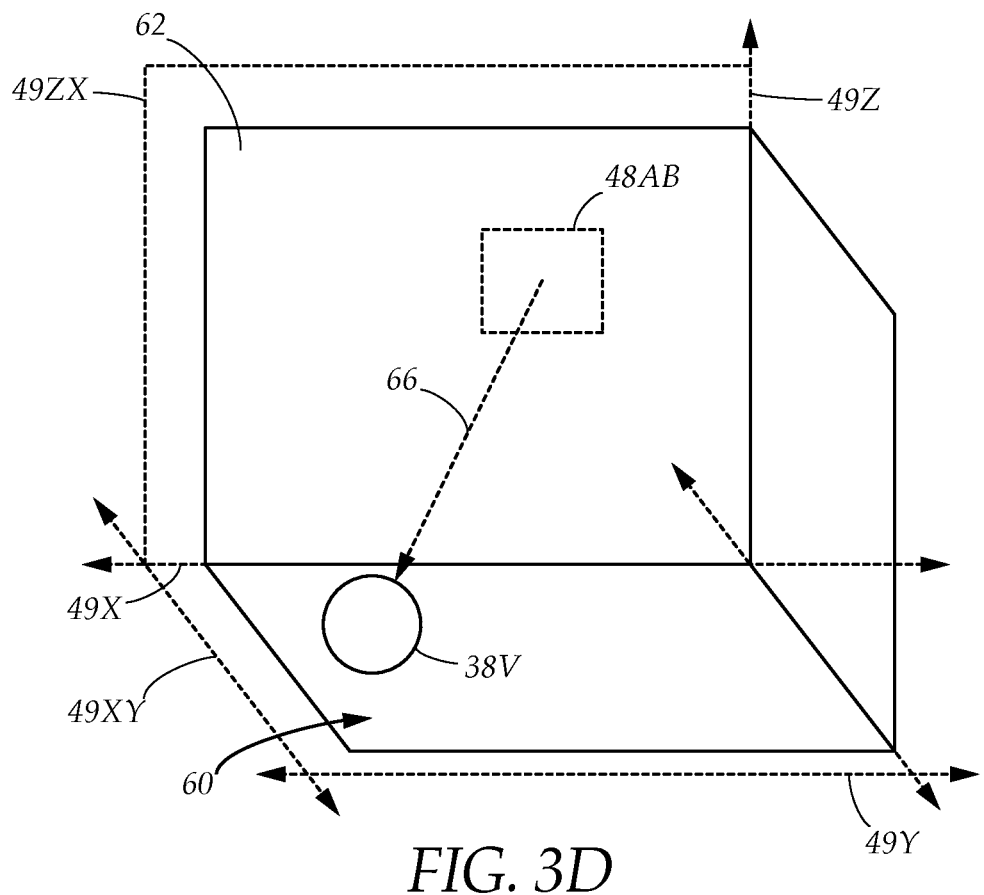
FIG. 3D is a diagrammatical perspective view of a virtual game space, depicting a virtual game object moving along an inbound virtual path, in accordance with an embodiment in the present disclosure.

Referring to FIGS. 3C-D while also referring to FIG. 1 and FIG. 2A, in one embodiment, the motion of the movable game object 38 may be quantified as a three dimensional velocity vector with a magnitude component and direction component corresponding to an inbound speed 40S and an inbound angle respectively. The inbound speed 40S may correspond to the speed at which the movable game object 38 is travelling at the instant which the movable game object 38 crosses, or otherwise physically interacts with, the physical portal boundary 34. In embodiments where the physical portal boundary 34 can be defined as a plane, the inbound angle may be measured relative to a theoretical physical portal plane 46 which is superimposed over the physical portal boundary 34 for purposes of measuring the inbound angle. For example, the inbound angle may be determined using X axis 47X, Y axis 47Y, and Z axis 47Z components within a three dimensional Cartesian coordinate system, with the physical portal plane 46 being coplanar with the ZX plane 47ZX.

Continuing to refer to FIGS. 3C-D along with FIGS. 3A-B, in certain embodiments, the game object tracking sensor 58 may be used to measure an inbound intersection point 48A corresponding to a point on the physical portal plane 46 where the movable game object 38 crosses the physical portal plane 46. The inbound intersection point 48A can be expressed as a set of coordinates within the ZX plane 47ZX. Positions with the virtual game space 60 may also be quantified using a virtual X axis 49X, virtual Y axis 49Y, and virtual Z axis 49Z within a three-dimensional Cartesian coordinate system. The virtual portal boundary 62 may be coplanar with a virtual ZX plane 49ZX. The inbound intersection point 48A can be mapped to a virtual inbound intersection point 48AB upon the virtual portal boundary by applying the ZX plane 47ZX coordinates associated with the inbound intersection point 48A to the virtual ZX plane 49ZX. Mapping the coordinates of the physical portal plane 46 to the virtual portal boundary 62 allows the virtual portal boundary 62 to function as a virtual representation of the physical portal boundary 34.

Referring to FIG. 3A-D and FIG. 5A along with FIG. 1 and FIG. 2A, the inbound motion data 40 captured by the game object tracking sensor 58 may be utilized by the virtual competitive game to translate the inbound speed 40S and inbound angle of the movable game object 38 to an inbound virtual speed and an inbound virtual angle, thus allowing movement of the virtual game object 38V to approximate the speed and direction of the movable game object 38, at the time of the physical interaction between the movable game object 38 and the physical portal boundary 34. The inbound virtual speed and inbound virtual angle are applied to the virtual game object 38V, allowing the virtual game object 38V to follow an inbound virtual game object path 66 which approximates the inbound path 40P of the movable game object 38 in relation to the physical portal plane 46. For example, the inbound virtual path 66 is oriented at an inbound virtual angle in relation to the virtual portal boundary 62, which corresponds to the inbound angle between the inbound path 40P of the movable game object in relation to the physical portal plane 46. The inbound virtual path 66 may originate from the inbound virtual intersection point 48AB. The inbound virtual angle may precisely or generally correspond to the inbound angle, so long as the general path of the movable game object 38 is transferred to the inbound virtual path 66.

The inbound virtual speed may be a proportional approximation of the inbound speed 40S of the movable game object 38. The inbound virtual speed quantifies how quickly the virtual game object 38V moves within the virtual game space 60. For example, if the movable game object 38 is traveling at an inbound speed of five meters per second as it crosses the physical portal plane 46, the inbound speed may be translated into the virtual competitive game such that the inbound virtual speed corresponds to a scaled approximation of the inbound speed 40S, proportionally scaled in relation to the relative size of the virtual players 24 and the virtual game space 60. Alternatively, the inbound virtual speed may simply be a general approximation of the inbound speed 40S, corresponding to speed ratings such as fast, medium, slow, or other similarly broad classifications. In one example purely for illustrative purposes, the speed ratings of fast, medium, and slow may correspond to physical inbound speeds 40S of up to five, ten, and twenty meters per second respectively.

Note that in certain embodiments where the virtual game space 60 is two dimensional, the inbound motion data 40 may be represented as a two dimensional vector using two axes, with movement of the virtual players 24 and the virtual game object 38V in the virtual game space 60 being implemented using a two dimensional Cartesian coordinate system.

Referring to FIGS. 5A-B while also referring to FIG. 1 and FIG. 2A, the virtual gameplay within the virtual competitive game can trigger a virtual to physical game transition, which results in a physical game effect which affects the physical sports activity. In certain embodiments, the movable game object 38 is removed from play within the physical sports activity upon the occurrence of the physical to virtual game transition, to simulate the movable game object 38 traveling through the interactive game portal 32 and into the virtual game space 60 Therefore, the physical game effect may be the return of the movable game object 38, or an identical equivalent, to the physical playing area 13 upon the occurrence of the virtual to physical game transition, allowing the physical sports activity to continue. The movable game object 38 may also be returned to the physical playing area 13 upon the virtual game object 38V passing through the virtual portal boundary 62. The virtual game object 38V travels along an outbound virtual path 68 which approaches and then passes through the virtual portal boundary 62.

In one example of the virtual competitive game, the first team may be on the offensive, with the second team attempting to cause the virtual game object 38V to travel through the virtual portal boundary 62 and trigger the virtual to physical game transaction before the first team can achieve the virtual game objective 64. In another example of the virtual competitive game, the virtual game space 60 contains a virtual playing field 61 which functions as a surface upon which the virtual players 24 are positioned, while the virtual portal boundary 62 is positioned as a horizontal plane below the virtual playing field 61. The virtual to physical game transition is triggered upon the virtual game object 38V falling downward within the virtual game space 60 and then passing through the virtual portal boundary 62.

Referring to FIG. 1, FIG. 2A, and FIG. 6A-C, in order to implement the physical game effect of the movable game object 38 being reintroduced into the physical sports activity, the multidimensional sports system 10 may therefore further comprise one or more game object projectors 70 which are adapted to launch or propel the movable game object 38 onto the physical playing area 13, as well as a projector controller 76. The game object projector 70 can be implemented using various ball launching devices which will be known to a person of ordinary skill in the field of the invention. The projector controller 76 is operably linked to the game object projector 70 as well as the game host device 18, and allows the game host device 18 to initiate launching of the movable game object 38 as well as direct the game object projector 70 to project the movable game object 38 along a specific outbound physical path 42P.

In one embodiment, the game object projector 70 comprises a launching mechanism 72 adapted to physically propel the physical game object onto an outbound physical path 42P. In one example, the launching mechanism 72 is implemented using one or more rotating wheels which make contact with the movable game object 38, and then launch the movable game object 38 in the direction of rotation of the rotating wheels. Other mechanisms may also be used, such as moving throwing arms, spring loaded or pneumatic launching mechanisms, or any other suitable mechanism known to a person of ordinary skill in the art in the field of the invention. In one embodiment, the launching mechanism 72 is configured to project the movable game object 38 at various speeds, such as by increasing or decreasing force applied to the movable game object 38. For example, where the launching mechanism 72 utilizes rotating wheels to launch the movable game object 38, the rotation speed of the wheels may be increased or decreased to increase or decrease the outbound physical speed of the movable game object 38. Increasing the outbound physical speed 42S may lengthen the outbound physical path 42P, causing the movable game object 38 to travel farther within the physical playing area 13.

The game object projector 70 may also comprise a rotation mechanism 74H, and a vertical elevation mechanism 74V. The rotation mechanism 74H is adapted to selectively turn the launching mechanism in a rightward or leftward direction to control a horizontal orientation 42H of the outbound physical path 42P, while the vertical elevation mechanism 74V is adapted to selectively elevate or depress the launching mechanism 72 in order to control a vertical orientation 42V of the outbound physical path 42P. In one embodiment, the rotation and elevation mechanisms 74H, 74V may be implemented using motors, actuators, or other mechanisms controlled by signals transmitted from the projector controller 76.

The game object projector 70 may be positioned at various points within the physical playing area 13. In one embodiment, the game object projector 70 may be positioned so that the movable game object 38 crosses the physical portal boundary 34 from the second side 59B after being launched, and then travels away from the first side 59A of the physical portal boundary 34. This simulates the movable game object 38 returning to the physical playing area 13 from the virtual game space 60 by crossing the physical portal boundary 34 in a direction opposite to its direction of entry.

Referring to FIG. 5A along with FIG. 6A-C, FIG. 1, and FIG. 2A, to enhance the virtual to physical game transition, the motion of the virtual game object 38V may be used to determine the outbound physical path 42P of the movable game object 38 as it is launched from the game object projector 70. As such, the motion of the virtual game object 38V within the virtual game space 60 may be quantified as outbound motion data 42 comprising an outbound virtual speed, and an outbound virtual angle.

The outbound virtual speed quantifies the relative rate of motion of the virtual game object 38V within the virtual game space 60 at the moment the virtual game object 38V passes through the virtual portal boundary 62 at an outbound virtual intersection point 48C. The outbound virtual speed and may be translated into an outbound physical speed 40S which increases or decreases in proportion to the outbound virtual speed. The outbound virtual speed may be determined by interactions between the virtual players and the virtual game object 38V. For example, the virtual competitive game may simulate the virtual player 24 kicking, throwing, or otherwise propelling the virtual game object 38V toward the virtual portal boundary 62 at different outbound virtual speeds.

In one embodiment, the direction of the outbound physical path 42P may be determined in a manner which is similar to the process for translating the inbound path 40P into the inbound virtual path 66, but in reverse. The outbound virtual path 68 may be expressed as a three dimensional vector with a magnitude corresponding to an outbound virtual speed, and a direction corresponding to an outbound virtual angle measured relative to the virtual portal boundary 62. The outbound virtual path 68 may be translated to the outbound physical path 42P by aligning the launching mechanism 72 of the game object projector so that the movable game object 38 is launched at an outbound physical speed 42S which approximates that of the outbound virtual speed, and at an outbound physical angle which approximates the outbound virtual angle.

Note that in some embodiments, it is only necessary for the outbound physical path 42P to broadly approximate the outbound virtual path 68. For example, the motion of the virtual game object 38V can be translated to the outbound physical path 42P by imparting the outbound physical path 42P with a rightward, central, or leftward horizontal trajectory 42H which reflects the outbound virtual path 68 as it crosses the virtual portal boundary 62. A rightward, central, and leftward orientation will cause the movable game object 38 to be launched at a rightward, central, or leftward trajectory respectively, as the movable game object 38 passes through the physical portal boundary 34. The vertical component of the outbound virtual path 68 may also be translated to the outbound physical path 42P through an upward, level, or downward vertical orientation 42V. The horizontal and vertical orientation 42H, 42V can be combined.

Referring to FIG. 1, FIG. 2A, FIG. 3A, and FIG. 5A, in certain embodiments, the multidimensional sports system may further comprise one or more virtual portal cameras 44 which are positioned within the physical playing area 13 and are oriented towards the second side 59B of the physical portal boundary. The virtual portal camera 44 captures video imagery of the physical playing area 13 through the physical portal boundary 34, which may then be transmitted to the game host device 18 via the physical-virtual interaction module 12. The game host device 18 superimposes the video imagery from the virtual portal camera 44 to create a virtual portal view 44V, simulating a virtual window effect whereby an observer viewing the virtual portal boundary 62 from within the virtual game space 60 will see the physical playing field 13 through the physical portal boundary 34.

Referring to FIG. 5A and FIGS. 6A-C while also referring to FIG. 1 and FIG. 2A, in one embodiment, the virtual game users 26 may utilize the virtual portal view 44V to analyze the physical playing area 13 and potentially direct the virtual game object 38V along a virtual outbound path 68 to a target point 79T within the physical playing area 13, or towards a target player 79P corresponding to one of the physical players 22.

In one embodiment, the virtual competitive game allows one of the virtual game users 26 to designate a point upon the physical playing area surface 13H which will serve as the target point 79T. Instead of orienting the outbound physical path 42P to approximate the outbound virtual path 68, the outbound physical path 42P is calculated in order to ensure that the movable game object 38 lands at or proximate to the target point 79T. For example, the game host device 18 may calculate outbound physical motion data 42D comprising the appropriate outbound physical speed 42S and outbound physical angle 42A. The outbound physical motion data 42D may be relayed to the projector controller 76 as projector settings 75 via the physical-virtual interface module 12 in the format of projector settings 75, resulting in the projector controller 76 interpreting the projector settings and transmitting the necessary signals to the rotation and vertical elevation mechanisms 74H, 74V to orient the game object projector 70 at the correct outbound physical angle 42A and launch the movable game object 38 at the correct outbound physical speed 42S.

In one embodiment, the game host device 18 may maintain a physical playing area virtual map which forms a virtual representation of the physical playing area surface 13H. Physical points upon the physical playing area surface 13H and virtual points upon the physical playing area virtual map may be referenced using a commonly shared coordinate system along a horizontal XY plane, allowing the coordinates of the physical points to be mapped to the coordinates of the virtual points, and vice versa. The target point 79P may therefore correspond to one of the virtual points. The physical position of the game object launcher 70 may also be reflected in the physical playing area virtual map. Once the target point 79P is selected, the game host device may 18 then determine the distance between the game object projector 70 and the target point 79P using the physical playing area virtual map, and then calculate the correct outbound physical speed 42S to allow the movable game object 38 to reach the target point 79P.

In certain embodiments, physical locations of the physical players 22 upon the physical playing area surface 13H may be tracked using the physical playing area virtual map and the commonly shared coordinate system, allowing the game object launcher 70 to project the movable game object 38 towards specific target players 79P. The multidimensional sports system 10 may further comprise one or more physical playing area sensors 50 adapted to track the physical location of each physical player 22 upon the physical playing area surface 13, thus linking the coordinates of the physical locations to corresponding coordinates of the physical playing area virtual map. Various sensor technologies may be utilized to identify and track the physical players 22 upon the physical playing area surface 13H, as will be apparent to a person of ordinary skill in the art in the field of the invention. In one example, the physical playing area sensors 50 may be implemented using video cameras paired with image analysis technology capable of identifying the physical players 22 and calculating the physical location of each physical player 22 upon the physical playing area surface 13H. The physical playing area virtual map and the physical location of each physical player 22 may be grouped together as playing area data 72, which may be stored in the game data store 21.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a multidimensional sports system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A multidimensional sports system for playing a multidimensional sports game, the multidimensional sports game having a physical component played via a physical sports activity and a virtual component played via a virtual competitive game, the physical sports activity is played by at least one physical player within a physical playing area and incorporates one or more movable game objects, the virtual competitive game is played by one or more virtual game users with each virtual game user controlling one or more virtual players, the multidimensional sports system comprising:

a game host device adapted to implement the virtual competitive game, the game host device adapted to initiate a physical to virtual game transition which transitions the multidimensional sports game from the physical component to the virtual component, allowing each virtual game user to control one or more of the virtual players to achieve a virtual game objective, the game host device further adapted to implement a virtual game space within which the virtual competitive game is played, the game host device creates a virtual game object within the virtual game space following the physical to virtual game transition, the game host device allowing the virtual game object to move within the virtual game space, whereby the virtual game transition is achieved by one of the virtual players carrying or propelling the virtual game object to contact an objective target within the virtual game space;

one or more player devices adapted to communicate with the game host device and receive input from the virtual game user for controlling the virtual players;

an interactive game portal positioned within the physical playing area, the interactive game portal having a portal boundary sensor, a physical portal boundary, and a frame with a frame opening, the portal boundary sensor has a detection zone and is adapted to detect a physical interaction between the movable game object and the physical portal boundary, the frame opening defining the physical portal boundary, the portal boundary sensor is positioned such that the detection zone covers the frame opening, allowing the portal boundary sensor to detect the physical interaction of the movable game object passing through the frame opening and the physical portal boundary;

a physical-virtual interaction module adapted to communicate with the portal boundary sensor and the game host device, whereby the portal boundary sensor is adapted to transmit a sensor signal to the physical-virtual interaction module upon detecting the physical interaction, the physical-virtual interaction module is adapted to transmit a transition signal to the game host device upon receiving the sensor signal; and a game object projector positioned within the physical playing area, the game object projector comprising a launching mechanism adapted to propel the movable game object within the physical playing area, wherein:

the game host device is further adapted to execute a virtual to physical game transition whereby the multidimensional sports game transitions from the virtual component to the physical component, causing the game object projector to propel the movable game object along an outbound physical path within the physical playing area; and the virtual game space has a virtual portal boundary, whereby the virtual game object crossing the virtual portal boundary initiates the virtual to physical game transition and causes the game object projector to propel the movable game object within the physical playing area.

2. The multidimensional sports system as described in claim 1, wherein:

the physical playing area has a physical playing surface and a boundary line marked thereon, the physical portal boundary corresponding to the boundary line, the portal boundary sensor is positioned within the physical playing area such that the detection zone covers the boundary line, allowing the portal boundary sensor to detect the physical interaction of the movable game object crossing the boundary line.

3. The multidimensional sports system as described in claim 1, further comprising:

a game object tracking sensor adapted to track the movable game object as the movable game object approaches the physical game portal along an inbound path and triggers the physical interaction between the movable game object and the physical portal boundary, the inbound motion data having an inbound speed and an inbound angle, the inbound angle is measured relative to the physical portal boundary, the game host device receives and translates the inbound motion data, causing the virtual game object to move within the virtual game space along an inbound virtual path having an inbound virtual speed approximating the inbound speed, and an inbound virtual angle measured relative to the virtual portal boundary and which approximates the inbound angle relative to the physical portal boundary.

4. The multidimensional sports system as described in claim 3, wherein:

the physical portal boundary has a first side through which the movable game object passes as it travels along the inbound path and a second side disposed opposite thereof and through which the movable game object exits after passing through the first side, the game object projector is positioned within the physical playing area such that the movable game object approaches and crosses the physical portal boundary from the second side as the movable game object travels along the outbound physical path, the game object projector further has a rotation mechanism which allows the outbound physical path to be horizontally adjusted relative to the physical portal boundary; and the outbound virtual path has an outbound virtual angle relative to the virtual portal boundary, and the outbound physical path has an outbound physical angle relative to the physical portal boundary, and the game host device is adapted to transmit projector settings to the game object projector, causing the game object projector to adjust the outbound physical path prior to propelling the movable game object such that the outbound physical angle approximates the outbound virtual angle.

5. The multidimensional sports system as described in claim 4, further comprising:

a game transition alert device positioned within the physical playing area, the game transition signaling device is adapted to produce a transition alert sound upon the occurrence of a physical to virtual game transition or a virtual to physical game transition.

6. The multidimensional sports system as described in claim 5, further comprising:

a spectator screen positioned within a sports venue which contains the physical playing area, the game host device transmits game video to the spectator screen depicting the virtual component of the multidimensional sports game being played within the virtual game space, whereupon the spectator screen presents the game video to spectators within the sports venue.

7. A method for playing a multidimensional sports game, the multidimensional sports game having a physical component played via a physical sports activity and a virtual component played via a virtual competitive game, the physical sports activity is played by a plurality of physical players within a physical playing area and incorporates one or more movable game objects, the virtual competitive game is played by a plurality of virtual game users with each virtual game user controlling one or more virtual players, the physical players and the virtual game users are organized into two opposing teams comprising a first team and a second team, the method comprising the steps of:

providing a game host device;

providing an interactive game portal positioned within the physical playing area, the interactive game portal having a portal boundary sensor, a physical portal boundary, and a frame with a frame opening, the frame opening defining the physical portal boundary;

providing a physical-virtual interaction module;

providing one or more player devices;

providing a game object projector positioned within the physical playing area;

initiating the physical component of the multidimensional sports game within the physical playing area;

physically propelling the movable game object by one of the physical players such that the movable game object crosses the physical portal boundary along an inbound path, causing a physical interaction between the movable game object and the physical portal boundary;

detecting the physical interaction of the movable game object passing through the frame opening using the portal boundary sensor, and transmitting sensor data to the physical-virtual interaction module;

transmitting a transition signal to the game host device by the physical-virtual interaction module and causing a physical to virtual game transition;

initiating the virtual component of the multidimensional sports game by the game host device;

implementing a virtual game space and creating a virtual game object therein;

implementing a virtual portal boundary within the virtual game space;

inputting player commands by the virtual game users via the player devices to control the virtual players;

moving the virtual players within the virtual game space via the player commands and manipulating the virtual game object by at least one of the virtual players;

triggering a virtual to physical game transition by propelling the virtual game object within the virtual game space along an outbound virtual path which crosses the virtual portal boundary;

resuming the physical component of the multidimensional sports game and propelling the movable game object by the game object projector along an outbound physical path;

triggering a second physical to virtual game transaction; and achieving a virtual game objective by manipulating the movable game object to contact an objective target by the virtual player of one of the teams.

8. The method as recited in claim 7, wherein:

the step of providing an interactive game portal is followed by the step of providing a game object tracker;

the step of detecting the physical interaction further comprises tracking the movable game object along the inbound path using the game object tracker, and detecting inbound motion data as the physical interaction occurs, the inbound motion data having an inbound speed, and an inbound angle measured relative to the physical portal boundary; and the step of implementing a virtual game space is followed by the step of moving the virtual game object away from the virtual portal boundary along an inbound virtual path, the inbound virtual path having an inbound virtual speed which approximates the inbound speed, and an inbound virtual angle measured relative to the virtual portal boundary which approximates the inbound angle.

9. The method as recited in claim 8, wherein:

the physical portal boundary has a first side and a second side opposite thereof;

the game object projector further has a rotation mechanism;

the step of physically propelling the movable game object further comprises physically propelling the movable game object by one of the physical players such that the movable game object crosses the physical portal boundary via the first side along an inbound path;

the step of triggering a virtual to physical game transition further comprises propelling the virtual game object within the virtual game space along an outbound virtual path which crosses the virtual portal boundary at an outbound virtual angle relative to the virtual portal boundary; and the step of resuming the physical component further comprises orienting the game object projector using the rotation mechanism and propelling the movable game object by the game object projector along an outbound physical path which approaches and crosses the physical portal boundary from the second side of the physical portal boundary, the outbound physical path having an outbound physical angle measured relative to the physical portal boundary which approximates the outbound virtual angle.

10. The method as recited in claim 9, wherein:

the interactive game portal further has a transition alert device; and the step of transmitting a transition signal further comprises producing a transition alert sound using the game transition signaling device.

11. The method as recited in claim 10, wherein:

the physical playing area is contained within a sports venue;

the step of providing a game host device is followed by the step of providing a spectator screen; and the step of initiating the virtual component of the multidimensional sports game further comprises generating game video by the game host device depicting the virtual competitive game being played within the virtual game space, and displaying the game video to spectators within the sports venue using the spectator screen.

* * * * *